United States Patent Office 3,580,736
Patented May 25, 1971

3,580,736
PAPERBOARD IMPREGNATED WITH A PETROLEUM WAX-POLYURETHANE BLEND
Hallard C. Moyer, Homewood, Ill., and Eugene M. Fauber, Hammond, Ind., assignors to Atlantic Richfield Company, New York, N.Y.
No Drawing. Filed Apr. 26, 1967, Ser. No. 633,717
Int. Cl. C08g 51/52; D21h 1/40
U.S. Cl. 117—155          7 Claims

ABSTRACT OF THE DISCLOSURE

Paperboard is impregnated with a composition containing a major amount of petroleum wax and a minor amount of a wax-compatible urethane which is prepared from an excess of a hydrocarbon diisocyanate and a hydroxy-terminated diene polymer. The preferred diisocyanate is tolylene diisocyanate and the preferred polybutadiene has at least two average terminal hydroxyl groups in the allylic position. Impregnation of paperboard with the composition provides a product having significantly improved strength, rigidity and water resistance.

---

This invention relates to paperboard having improved strength and water-resistance properties and to a wax composition for impregnating the paperboard. More particularly the invention relates to corrugated paperboard impregnated with a novel wax composition which paperboard can be used to make boxes and cartons with improved stacking strength and rigidity, especially when in direct contact with water.

The loss of strength which corrugated paperboard boxes exhibit on contact with water has restricted their utility or prevented their use for many types of service. A notable example is the shipment of fresh produce where the food must be sprayed with cold water or packed with ice. Another example is the shipment of frozen foods where the container must be able to withstand contact with water during temporary periods of exposure to thawing conditions. Another example is the handling, shipping, or storage of articles or materials when some exposure to weather is necessary.

Some progress has been made in improving the moisture resistance of corrugated paperboard. For example, it is well known to impregnate corrugated paperboard cartons with petroleum wax, or to impregnate the corrugated paperboard with wax before the cartons are formed, or to carry out the impregnation coincident with the corrugating process. Such treatments have resulted in improved moisture resistance, particularly in such instances where the moisture is present as high humidity rather than as liquid water. In an effort to impart still better water resistance and strength retention, additives have been included in the wax, for instance, polyethylenes and terpene resins have been used. U.S. Pat. No. 2,967,116 to Hollinger et al. advocates inclusion of a hard, high melting thermoplastic polymer prepared from certain fractions derived from petroleum.

Unfortunately, the various wax compositions and methods of application have not afforded the degree of rigidity and stacking strength desired where the box or carton has substantial contact with liquid water. Consequently, in spite of the many desirable features of the corrugated box as a shipping and storage container, the wax-impregnated corrugated box has gained only limited acceptance in those areas of use where actual contact with water or other aqueous media is involved.

It has now been found that a paperboard base impregnated with a wax composition composed of a petroleum wax and a wax-compatible isocyanate-terminated urethane type polymer provides a paperboard product significantly improved in strength, rigidity and water resistance.

There is no particular limitation on the type of wax employed in the composition of the invention, and selection of an appropriate wax will be largely determined by the properties, such as stiffness, which are desired in the final product. The melting point of the wax employed should also be considered as it will effect the melting point of the impregnant itself. Further, waxes of too high melting point should be avoided as the higher mixing temperatures which are necessitated may induce instability or premature curing in the prepolymer-wax blend or may cause undue drying of the paperboard during impregnation. It is, therefore, preferred that waxes having melting points from about 125–135° F. be employed in the present invention.

The isocyanate-terminated urethane polymer employed in this invention should be compatible with the wax used and can be formed by reacting a polyhydroxy-terminated diene polymer with an excess of a suitable diisocyanate. It is preferred that diene polymers having at least two terminal, allylic hydroxyl groups be used. The ratios of diisocyanate and polyol employed will often be from about 1.5 to 4 or more, preferably about 2 to 3 moles of diisocyanate per mole of diene polymer but in any event the reaction will be such as to give a moisture-curing polymer.

The preferred diene polymer of the present invention is a hydroxyl-containing polymer oil generally having on the average of at least about 1.8 predominantly primary, terminal, i.e., attached to a terminal carbon atom, hydroxyl groups per polymer molecule. Most advantageously, the polymer has greater than two average allylic, terminal hydroxyl groups, e.g., at least 2.1 to, say 2.6, or even 3 or more. Also, two terminal hydroxyls are generally separated by a long carbon-carbon chain. Determined as milli-equivalents of potassium hydroxide equivalent to the hydroxyl content of one gram of polymer, the polymers will often have a hydroxyl value of about 0.5 to 1.5, preferably 0.7 to 1.0. The hydroxyl-containing diene polymers used in the present invention may have number average molecular weights in the range of about 200 to 25,000 and viscosities at 30° C. of about 5 to 20,000 poises. The preferred hydroxyl-containing diene homopolymers and copolymers will be in the molecular weight range of about 900 to 10,000.

The diene polymers which are used in this invention may have primary hydroxyl groups which are allylic in configuration, thereby being of a more reactive nature in the condensation polymerization reaction and apparently providing an improved stability in the final elasomer product. The preferred diene partial polymer also has the majority of its unsaturation in the main hydrocarbon chain, providing polymers of improved elasticity characteristics. Also, it has been found that the high trans-1,4-unsaturation of many of the usable diene intermediate polymers gives urethane rubbers which appear to crystallize on stretching in a manner reminiscent of natural rubbers. The presence of more than two hydroxyls in the polymer molecule provides cross-linking sites without the need to employ excess isocyanate or other extraneous cross-linking agents, e.g., triol, in the later polymerization.

The dienes which are employed to make the diene polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, or alkyl, generally lower alkyl, e.g. of 1–4 carbon atoms. Typical dienes which may be employed are 1,3-butadiene, isoprene, 2,3-dimethyl-1,3-butadiene, etc.

The hydroxyl-terminated diene homopolymer and copolymer products used in accordance with the present invention preferably have a hydroxyl-functionality greater than two, e.g., in the range of 2.1 to 2.6, although the functionality may exceed the range cited, e.g., it may range up to three or more. Those polymers of greatest utility have been found to have primary hydroxyl groups in terminal allylic positions on the main, generally longest, hydrocarbon chain of the molecule. By "allylic" configuration is meant the alpha-allylic grouping of allylic alcohol, that is, the hydroxyls of the intermediate polymer or the hydroxyl residues of the finished elastomer are attached to a carbon adjacent to a double-bond carbon.

Olefinically unsaturated monomers may be incorporated into the diene intermediate polymer products used in this invention and these may often be components which provide additional cross-linking sites for the diisocyanate include alpha-mono-olefinic materials of about 2 or 3 to 10 or 12 carbon atoms such as hydrocarbon and ester materials, e.g., styrene, vinyl toluene, methyl methacrylate, methylacrylate, other acrylic esters, etc. The choice and amount of mono-olefinic monomer employed will often be determined on the basis of properties desired in the final elastomer resin. Generally the amount of mono-olefinic monomer in the polymer will be about 0–75% by weight of the total addition polymer, preferably about 1 to 40%, or even about 10–40%.

Exemplary of the hydroxy-terminated polybutadiene homopolymers and copolymers which may be employed in this invention are: polybutadiene 45 which is polybutadiene homopolymer having a viscosity of 50 poises at 30° C., a hydroxyl content of 0.95 meq./gm., a hydroxyl number (mg. KOH/gm.) of 53, an average molecular weight of 2000–2500, about 2.1–2.2 terminal, allylic, hydroxyl groups which are predominantly primary, and an iodine number of 398, and which can be prepared by polymerizing 100 parts of butadiene in the presence of 70 parts of isopropanol and 10 parts of hydrogen peroxide in an aluminum clad autoclave at 118° C. for 2 hours; polybutadiene 15 which is a homopolymer having a viscosity at 30° C. of 200 poises, a hydroxyl content of 0.80 meq./gm., a hydroxyl number of 45 mg. KOH/gm., an average molecular weight of 3000–3500, about 2.6 terminal allylic hydroxyl groups which are predominantly primary and an iodine number of 395, and which can be made by polymerizing 100 parts of butadiene in the presence of 35 parts of isopropanol and 6 parts of hydrogen peroxide for 2½ hours at 130° C.; styrene copolymer 15 which has a molecular weigh of about 2200–2500, a viscosity at 30° C. of 250 poises, a hydroxyl content (meq./gm.) of 0.95, a hydroxyl number of 53 mg. KOH/gm. about 2.5 terminal, allylic, hydroxyl groups which are predominantly primary; and an iodine number of 335, and can be made by polymerizing 75 parts butadiene and 25 parts styrene in the presence of 70 parts isopropanol and 10 parts of 50% hydrogen peroxide for 2½ hours at 120° C. Of these oils the polybutadiene 45 has the advantage that it exhibits unusually low viscosity which makes for ease of handling at the lowest possible temperatures, and also results in the formulation of polybutadiene-diisocyanate "prepolymer" characterized by similar low viscosity.

The diisocyanate employed in this invention may be either aliphatic, including cycloaliphatic or aromatic such as 2,4-tolylene diisocyanate, metaphenylene diisocyanate, 2,6-tolylene diisocyanates (or mixtures of these materials), transvinylene diisocyanate, p,p'-diphenylmethane diisocyanate and hexamethylene diisocyanate, as well as related aromatic and aliphatic hydrocarbon diisocyanates, which may also be substituted with other organic or inorganic groups that do not unduly adversely affect the course of the chain-extending reaction.

It is preferred, that in blending the diisocyanate with the diene polymer a small amount of the polymer oil be blended initially with the diisocyanate in order to establish a large excess of the diisocyanate. The balance of the polydiene can then be added slowly with mixing so that an excess of the diisocyanate is maintained for a major portion of the time required for preparation. The reaction between the two ingredients takes place readily on mixing with sufficient agitation; the rate of reaction being affected by the particular diisocyanate used. As an alternative procedure to the above, a diisocyanate, such as tolylene diisocyanate, which is compatible with the wax to be employed may first be mixed with the molten, substantially anhydrous wax. The polydiene can then slowly be added to the wax-diisocyanate mixture with good stirring.

The amount of polydiene-diisocyanate "prepolymer" which is added to the wax should be sufficient to produce the desired properties, e.g., as to strength and degree of waterproofing. Often the wax will constitute the major portion of the impregnant, while a minor amount, say at least about 5 weight percent based on the wax, preferably about 10 to 35 percent of the mixture will be the prepolymer. For some applications, such as waterproofing canvas, as much as about 50 percent or more of the prepolymer might be used, though in such cases a diluent such as some volatile solvent might be employed.

The impregannt containing the wax and the isocyanate-terminated "prepolymer" has the advantage that it is sufficiently stable to be held for prolonged periods of time at impregnation temperatures, e.g. about 150–190° F. prior to application to the paperboard without a wax-incompatible material forming. Further, the impregnant can be prepared so as to possess a low working viscosity which does not increase significantly before or during application. Thus, there is no formation of a gel which might interfere with the impregnation or hinder run-off of excess impregnant. Inasmuch as low temperatures of about 150–190° F. can, for example, be employed for impregnation in the present invention, undue heat-induced curing of the wax-prepolymer blend can be avoided prior to its proper placement in the paperboard.

Employing the impregnant of the present invention, curing is effected by the reaction of the wax-prepolymer with moisture in the material being treated. It is, therefore, desirable to employ a paperboard or other material which has a significant moisture content, for instance at least about 5 weight percent. This moisture may be already present in the board or it may be introduced into the board by such processes as steaming, in which case it will often be about 8 to 30 percent of the weight of the paperboard.

The base sheet material impregnated with the composition of the invention can be any suitable paperboard but is preferably corrugated paperboard. In perhaps its most practical aspect the corrugated paperboard can be impregnated in the form of a blank which will ultimately be erected into a box. Ordinarily corrugated paperboard is composed of a crimped medium having flat liners adhered to the crests of the crimped or corrugated medium. Sufficient wax-prepolymer blend is used to provide an impregnated paperboard with increased water resistance. Often at least about 15 percent advantageously at least about 25 percent and most preferably about 50–80 percent of the impregnant is employed, based on the total dry weight of the paperboard. Application of the impregnant to the base sheet may be by immersion, which is preferred, followed by draining off of the excess or by spraying or rolling on or any other desirable technique.

If desired, minor amounts of other wax-compatible resinous materials known to improve the paperboard, e.g. its wet and dry strength, can be blended with the impregnant of the invention and the resulting blend employed as the impregnant. Suitable components are, for example hydrocarbon polymer resins having an ASTM ring and ball softening point of above about 150° F., for instance, up to about 275° F. Particularly preferred are hydrocarbon polymer resins having as a repeating unit an aliphatic mono-cyclic terpene radical. Examples of the latter resins are polyterpene resins (Piccolyte Resins) which can be made by the acid catalyst polymerization of β-pinene. If employed, about 5 to 35%, preferably about 10 to 25% by weight based on the blend, of the additional polyterpene resin is often combined with about 65 to 95 percent preferably 75 to 90 percent, by weight of the wax-polydiene prepolymer blend of this invention. Incorporation of the resin can be easily effected by heating at an elevated temperature, such as about 180 to 250° F. or more, with the wax before adding the other materials.

The follwing examples are provided to demonstrate both the practice of the invention and the superior properties in terms of strength found in the final impregnated specimens.

EXAMPLE I 800 g. of a moderately hard, 129° M.P. paraffinic petroleum wax was melted and to this was added 30 g. tolylene diisocyanate (TDI). To this blend was slowly added with good agitation 170 g. of a 2100 average molecular weight, hydroxyl-terminated, allylic, polybutadiene oil 45. This corresponded to about a 2:1 mole ratio of TDI to polybutadiene. With this mixture at 190° F., specimens of corrugated board, 4 x 6" and previously conditioned at 25% relative humidity, were immersed for 10 seconds with the flutes vertical to permit complete entry of the impregnant. The specimens were removed, the excess mixture allowed to drain, and the specimens were then allowed to drain completely in an oven at 275° F. for about 15 minutes. Some of these specimens were then allowed to stand at normal ambient conditions for 24 hours and then soaked in water at room temperature for 60 minutes. These specimens were tested immediately for flat crush strength on an Instron tester. In addition to these, specimens were prepared similarly using a blend of 80 percent of the above 129° M.P. wax and 20 percent of a 100° C. softening point petroleum resin of the type described in U.S. Pat. 2,967,116 to Hollinger et al. In addition to specimens prepared with each of the above treating materials, specimens were also prepared with each of these impregnants using corrugated board conditioned 24 hours at 90–100 percent relative humidity to provide corrugated board at high moisture content. Results of tests on the various specimens are shown in Table I, below:

TABLE I

| Impregnant | Water soak, min. | Flat crush, lbs., preconditioned at— | |
|---|---|---|---|
| | | 25% R.H. | 95% R.H. |
| Wax-polybutadiene-TDI 80:17:3 | 60 | 260 | 370 |
| Wax-petroleum resin 80:20 | 60 | 220 | 220 |
| None | 60 | <2 | |
| Do | 0 | 460 | |

The above crush results represent the load on the specimen not at collapse but at the first point at which the stress-strain tracing changes slope. This point has been found to be much more reproducible than a total failure point. It is also considered to provide a relative correlation of the load at which a box would fail structurally under a steady load.

After soaking, some of the above specimens were immersed in an aqueous solution of methylene blue for several minutes. The specimens were then removed from the blue solution and all excess dye washed off. The specimens treated with wax-polybutadiene-TDI showed scattered areas of slight blue stain on the exterior and interior surfaces, but the specimens treated with wax-petroleum resin showed solid, intense, dark blue stain on all interior and exterior surfaces. This in spite of the fact that the amount of impregnant was the same in each case (about 42% of the weight of the unwaxed board).

Specimens representing each of the above preparations were not soaked but were cooled to 0° F. in a cooler. While at 0° F., each of these was bent 90° over a sharp edge and then reversed and bent a total of 180° of a net of 90° in the opposite direction, the specimens impregnated with the wax-polybutadiene-TDI treatment did not break, while 3 of 4 of the speciments treated with wax-petroleum resin burst or partially burst at the score line.

EXAMPLE II

An isocyanate-terminated polybutadiene polymer was prepared by rapidly adding 350 g. TDI to 1000 g. of a 2100 mol. wt., hydroxyl-terminated, allylic, polybutadiene 45 and agitating the mixture for 15 minutes. This represents a mole ratio of about 4:1, which means that there is a substantial amount of excess TDI beyond that required (approximately 2:1 mole ratio) for maximum reaction with the polybutadiene. An impregnant was prepared by blending 80 percent of the wax of Example I with 20 percent of this isocyanate terminated polymer. Specimens of treated, corrugated board were prepared as in Example I, and the test results of Table II were obtained on specimens soaked 60 minutes at room temperature.

TABLE II

Flat crush, lbs.
Board pre-conditioned at 25% rel. hum. _____ 280
Board pre-conditioned at 90% rel. hum. _____ 350

Tests as described in Example I showed that these specimens also had a high resistance to staining with methylene blue solution and were more flexible than comparable specimens treated with the 80:20 blend of wax and petroleum resin.

EXAMPLE III

Using the procedures described in Example I, except as otherwise noted, the corrugated specimens, befor impregnation, were conditioned at about 95–100 percent relative humidity, raising the moisture content of the board from a typical value of 5 percent to about 12–14 percent. Some of these specimens, before impregnations, were subjected to additional exposure to moisture by contact with a steam jet, which raised the moisture content of the board to about 16–18 percent. Materials used were of the same general description as in Example I. In addition, an impregnating blend was made using a hydroxy-terminated copolymer of butadiene and styrene, i.e. copolymer 15. After the specimens were impregnated, drained and cooled, they were allowed to stand for several days at normal ambient conditions and then soaked in water and tested as in Example I. The results are shown in Table III

TABLE III

| Impregnant | Flat crush, lbs., conditioned at— | |
|---|---|---|
| | 95% R.H. | 95% R.H. plus steam |
| Wax-polybutadiene-TDI 80:17½:2½ | 225 | 270 |
| Wax-polybutadiene-TDI 80:17:3 | 300 | 400 |
| Wax-copolymer-TDI 80:17:3 | 320 | |

Here again, the crush result represents load on the specimen at the first inflection point of the stress-strain curve. The results indicate the beneficial effect on strength and water resistance of adding moisture to the board before impregnating. It is apparent that one can improve the strength of the board while using increased rather than, e.g., a decreased moisture content, so that the finished product has not only better rigidity but better toughness and less brittleness.

We claim:

1. An article of manufacture comprising paperboard impregnated with a wax composition comprising a major amount of petroleum wax and a minor amount of a moisture-curing, wax-compatible, isocyanate-terminated urethane reaction product of a hydroxy-terminated aliphatic hydrocarbon diene polymer oil and a hydrocarbon diisocyanate.

2. The article of manufacture of claim 1 wherein the wax composition contains about 10 to 35 percent by weight of the wax-compatible urethane reaction product.

3. The article of manufacture of claim 1 wherein the diene polymer oil is a polybutadiene oil containing at least two average terminal, allylic hydroxyl groups per molecule.

4. The article of manufacture of claim 3 wherein the diisocyanate is tolylene diisocyanate.

5. The article of manufacture of claim 3 in which the urethane reaction product is prepared from about 1.5 to 4 moles of the diisocyanate per 1 mole of polybutadiene polymer.

6. The article of manufacture of claim 1 wherein the corrugated paperboard base contains about 8 to 30 percent moisture when impregnated.

7. The article of manufacture of claim 1 wherein the wax has a melting point from about 125–135° F.

References Cited
UNITED STATES PATENTS

| | | | |
|---|---|---|---|
| 3,055,952 | 9/1962 | Goldberg | 260—77.5CR |
| 3,427,366 | 2/1969 | Verdol | 260—77.5CR |
| 3,171,825 | 3/1965 | Mark | 260—28 |
| 3,338,861 | 8/1967 | Mastin | 260—77.5CR |
| 3,305,503 | 2/1967 | Russell | 260—28 |

MORRIS LIEBMAN, Primary Examiner

P. R. MICHL, Assistant Examiner

U.S. Cl. X.R.

117—158; 260—28, 28.5